June 15, 1971  M. I. MORGANSTEIN  3,585,080
POWER SUPPLY ACTIVATOR
Filed July 30, 1969  2 Sheets-Sheet 1
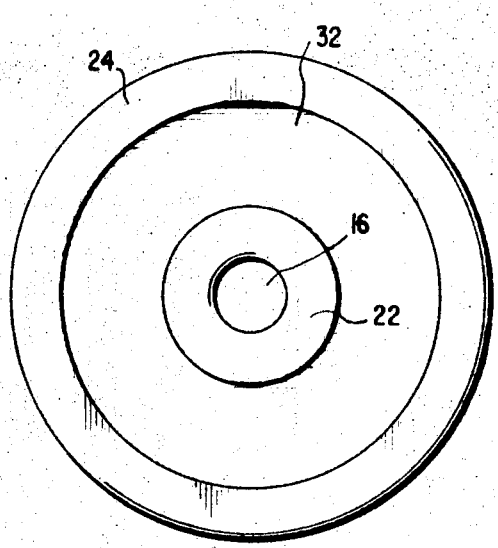
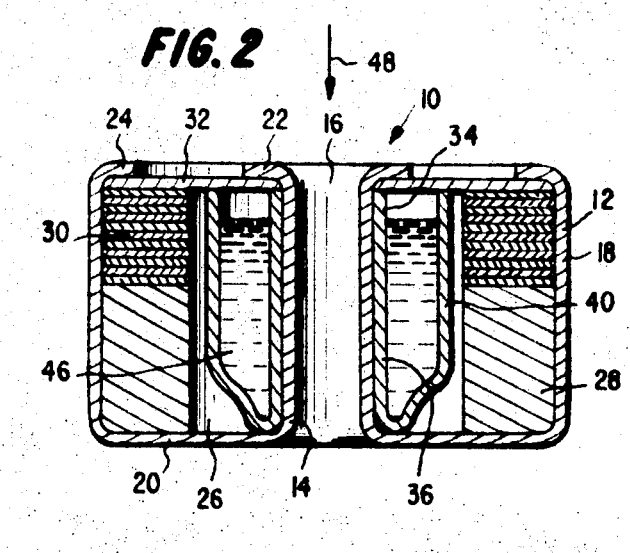
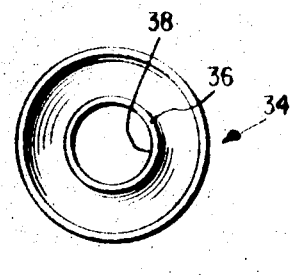
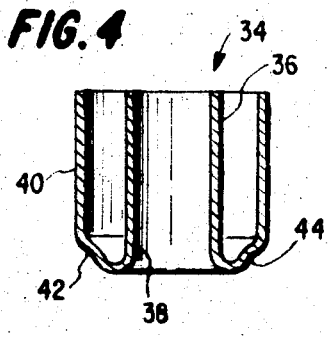
INVENTOR
MELVYN I. MORGANSTEIN
ATTORNEYS

United States Patent Office 3,585,080
Patented June 15, 1971

3,585,080
POWER SUPPLY ACTIVATOR
Melvyn I. Morganstein, Adelphi, Md., assignor to the United States of America as represented by the Secretary of the Army
Filed July 30, 1969, Ser. No. 846,093
Int. Cl. H01m 17/06
U.S. Cl. 136—90                              10 Claims

ABSTRACT OF THE DISCLOSURE

Disclosed is a power supply activator for use in a liquid reserve fuze power supply with a center hole. It releases electrolyte under spin and setback. Concentric inner and outer tubes are joined at one end by an integral diaphragm and at the other end to a lid. Under setback forces the diaphragm flexes and the outer tube breaks away from the lid to release the electrolyte. Before setback the outer tube is sealed to the lid to minimize leakage.

---

This invention relates to a power supply activator and more particularly to an electrolyte container for a liquid reserve electrochemical power supply usable in missile fuzes. The device provides a low cost container for electrolyte with a center hole particularly adapted for artillery projectile fuzes and other similar devices. It releases electrolyte to the battery cells under the influence of spin and setback forces when the projectile is fired from a gun.

As is well known, it is desirable that artillery projectiles and other missiles remain unarmed until they are actually fired so as to avoid inadvertent explosion of the projectile. For this purpose, it has been customary in the past to separate the electrolyte of the power supply from the power supply cell plates and to release the power supply only after the gun or artillery piece has been fired. In most instances, the electrolyte is retained in a frangible container, often in the form of a glass bottle, which is pierced and broken to release the electrolyte under the influence of the setback or acceleration forces when the projectile is fired. Centrifugal forces generated due to rotation of the projectile cause the electrolyte to be displaced into the battery cells so that upon firing the power supply becomes activated.

Previously proposed frangible containers, such as glass bottles, are expensive to construct and, in addition, are not readily adapted to fuze constructions in which the electrochemical power supply is provided with a detonator hole or tube through its longitudinal axis. The present invention overcomes these difficulties by providing a simplified and inexpensive electrolyte container which may be readily fabricated with a central detonator hole and which provides for reliable activation of the battery upon firing of the projectile in which the fuze is carried.

The container of the present invention comprises a "thimble" in the form of a double-walled cup with the walls formed as two concentric tubes joined by a curved cup-shaped bottom forming a flexible diaphragm. As "g-loading" is applied axially of the container, the outer tube or barrier, which is supported only at the outer edge of the diaphragm, exerts a downward force on this edge. The downward force collapses the diaphragm allowing the outer tube or barrier to drop. Projectile spin then throws the electrolyte into the surrounding annular cells of the battery or power supply.

It is therefore one object of the present invention to provide an improved power supply activator for projectile fuzes.

Another object of the present invention is to provide a simplified and inexpensive holder for electrolyte in a small fuze electrochemical power supply which has a hole in the center.

Another object of the present invention is to provide a power supply activator including a "drop-in" thimble in the form of a single one-piece item whch eliminates the multiple fabrication and plating steps of more complex constructions.

Another object of the present invention is to provide a simplified and inexpensive power supply activator which through suitable variations in design and manufacture may be constructed to operate accurately over a wide range of desired acceleration force levels.

These and further objects and advantages of the invention will be more apparent upon reference to the following specification, claims, and appended drawings, wherein:

FIG. 1 is a top plan view of an electrolytic power supply or battery constructed in accordance with the present invention;

FIG. 2 is a vertical section through the power supply of FIG. 1;

FIG. 3 is a top plan view of the copper thimble forming a part of the power supply of FIGS. 1 and 2;

FIG. 4 is a vertical cross section through the thimble of FIG. 3;

Figure 5:
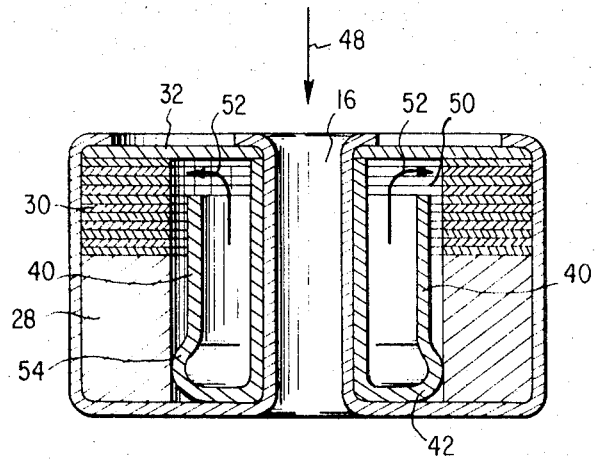
FIG. 5 is a vertical cross section through the power supply similar to that of FIG. 1 showing deflection of the thimble after firing of the projectile.

Referring to the drawings, the power supply is generally indicated at 10 in FIGS. 1 and 2 and comprises a metal housing 12 of hollow annular configuration having an inner tubular wall 14 defining a detonator hole 16 extending axially through the casing and an outer concentric wall 18. Inner and outer walls 14 and 18, respectively, are joined by an integral bottom 20 and the upper ends of the walls are turned over as at 22 and 24 to form substantially completely enclosed annular chamber 26. Received within the chamber 26 is an annular stack spacer 28 and a battery stack 30. Finally, chamber 26 is closed off by an annular disc 32 forming a lid for the power supply, which lid is retained by the annular flanges 22 and 24.

An important feature of the power supply 10 is the incorporation of a drop-in element in the form of a thimble, generally indicated at 34, and shown in more detail in FIGS. 3 and 4. Thimble 34 comprises inner wall 36 in the form of a hollow tube defining center hole 38 and a concentric outer wall 40 spaced from the inner wall 36. The inner and outer walls are joined by an integral diaphragm 42 having a reversed curve S-shaped cross section as indicated at 44. Inner wall 36 is of such diameter as to have a sliding fit over the inner wall 14 of case 12 as illustrated in FIG. 2.

Contained between walls 36 and 40 of the thimble is a fluid in the form of a battery electrolyte indicated at 46. By way of example only, the electrolyte may be a conventional $HBF_4$ electrolyte fluid in which case thimble 34 is preferably formed from pure sheet copper inert to the $HBF_4$ electrolyte and is fabricated in several drawing steps and then annealled for softness.

FIG. 2 is a cross section through the power supply before setback, i.e., before the projectile is fired, and FIG. 5 is a similar cross section showing the same structure after setback, i.e., after the projectile has been fired and is spinning, and shows the release of the electrolyte to the battery stack 30. As g-loading is applied axially in the direction of the arrow 48, the outer tube of the thimble or barrier 40, which is supported only at the outer edge of the diaphragm 42, exerts a downward force on this edge. The force is approximately equal to the weight of the barrier plus one-half the weight of the electrolyte, both at 1g times the number of g's of acceleration. As a typical example, the weight of 1g on the barrier is only 0.0015 pound, but under a setback acceleration of typically 100,000g, it is equivalent to a force of 150 pounds acting on the outer edge of the diaphragm. This downward force collapses the diaphragm into the position illustrated in FIG. 5 producing a space 50 between the upper end of the barrier and the underside of lid 32. Projectile spin acts to throw the electrolyte out through this space as indicated by the arrows 52 in FIG. 5 into the stack or battery cells 30. Increased downward movement of the diaphragm is incurred due not only to the collapse of the diaphragm but also due the simultaneous outward belling of the bottom or lower end of the barrier or outer wall 40 as illustrated at 54 in FIG. 5. This makes it possible to obtain a larger opening 50 than the .060 inch deflection for which the outer edge of the diaphragm 42 is constructed.

Tests indicate that the maximum force necessary to provide collapse in the embodiment illustrated is 50 pounds which is one-third of the available force. However, collapse can only occur so long as there is a setback g. Setback tests indicate that the duration in the gun (2 msec.) is sufficiently long for satisfactory collapse. Air gun tests with one-fourth the gun setback duration show an adequate .050 inch collapse but the actual gun produces greater deflection. No collapse of the inner thimble tube or wall 36 occurs since this wall is well supported by the bottom 20 of the casing.

Figure 6:
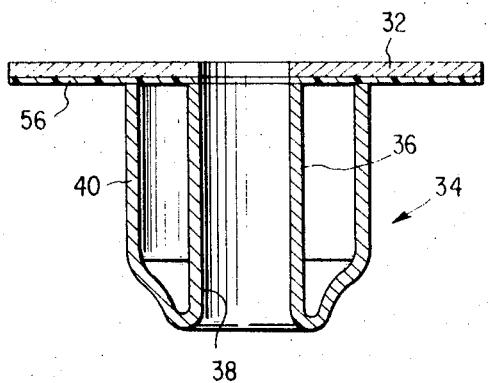
FIG. 6 is a cross sectional view illustrating the manner in which the thimble is attached to the power supply lid.

FIG. 6 shows one manner of securing the upper end of the thimble 34 to the lid 32. In this embodiment, the thimble is provided with a butt seal to the lid by means of a thin coating of polyethylene, as indicated at 56, between the upper end of the thimble and the underside of the lid. More specifically, the thimble is mounted in a heat sink and filled with a predetermined quantity of electrolyte. The battery lid onto which a .002 inch thick film of polyethylene 56 has been laminated is located on top of the thimble face with the film side of the lid down. Heat is then applied so as to fuse the polyethylene and provide a butt seal between the upper end of the thimble and lid 32. It is, of course, apparent that cold sealing may be employed and that materials other than polyethylene may be used. In this manner, a frangible butt seal having a maximum thickness of .002 inch is provided. The negligible area of this seal prevents significant diffusion of the water in the electrolyte through it, i.e., in the neighborhood of 1.5% in ten years. If desired, the top edge of the barrier may be made to extend slightly higher than the top edge of the thimble's inner tube 36 so that when the lid is sealed on the inner tube 36, the barrier 40 is kept in compression and the seal therefore maintained. The tensile strength on the polyethylene bond has been calculated to be 12,500 p.s.i. under setback. The ultimate strength of polyethylene is about 8,000 p.s.i., i.e., about two-thirds of the available stress.

By varying the metal thickness in the diaphragm or barrier or both, or by varying the degree of annealling, the g level required for opening may be changed. The rate of opening may be varied also. Materials other than polyethylene can be used for the seal, such as silicon rubber and the like. In addition, materials other than pure copper may be used to make the thimble, provided the material is covered with a suitable inert, pinhole free coating. For example, electroplated copper or silver or the like may be used.

Figure 7:
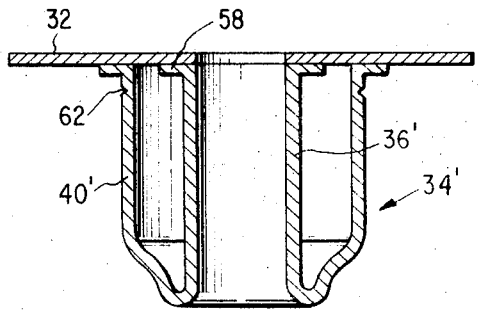
FIG. 7 is a similar cross section showing a modified thimble construction and its manner of attachment to the power supply lid.

FIG. 7 shows a modified arrangement for securing the thimble to lid 32 and the modified thimble of FIG. 7 is indicated as 34', having corresponding inner wall 36' and outer wall 40'. In FIG. 7, the inner and outer walls are provided at their upper ends with respective annular flanges 58 and 60 which are preferably welded to the lid undersurface such as by cold welding or the like. In this embodiment, the upper end of outer wall 40' adjacent flange 60 is provided with a weakening annular groove 62 which is cut around the outside of the outer wall or barrier 40'. Under setback, the outer wall of barrier fails at the groove or notch 62 under tension. Calculations indicate that with a groove .007 inch deep, the tensile stress in the plane of the groove is about 42,000 p.s.i. The ultimate strength of annealled pure copper is only about 32,000 p.s.i., so that the barrier will separate from the flange at groove 62 to permit electrolyte between barrier 40' and inner wall 36' to escape through this break under the influence of centrifugal force.

It is apparent from the above that the present invention provides an inexpensive and simplified power supply activator for missile fuzes and the like and one that is particularly designed for artillery projectiles requiring a central detonator hole extending axially through the center of the power supply. Important features of the present invention include a double-walled element or thimble joined at one end by an integral diaphragm, which thimble is supported such that the outer wall loads the outer edge of the diaphragm and is axially deflected under the influence of setback acceleration forces. The electrolyte container eliminates the necessity for the more expensive glass constructions and is particularly suited for very high g applications, whether with or without a central primer hole. It may be used to release and meter out fluid to give a built-in delay system and, because of its metallic construction, renders the power supply less susceptible to accidental initiation.

What is claimed and desired to be secured by United States Letters Patent is:

1. In an electrolytic power supply for projectiles subject to setback and rotation, including a casing having concentric inner and outer walls and a bottom defining an annular chamber, the improvement comprising an electrolyte container positioned in said chamber including spaced concentric inner and outer walls, a diaphragm joining the adjacent lower ends of said container walls, means engaging said container and supporting said diaphragm only adjacent said inner container wall, said outer wall being spaced from the bottom of said casing so as to be free to deflect said diaphragm and move axially of said inner wall under the influence of setback forces, and a lid covering the upper end of said container between said inner and outer container walls and being releasably secured to said outer container wall whereby said outer container wall breaks away from said lid under the influence of setback forces.

2. Apparatus according to claim 1 including a layer of plastic material on said lid forming a butt seal with said outer container wall.

3. Apparatus according to claim 2 wherein said layer comprises an approximately 0.002 inch thick film of polyethylene on the underside of said lid.

4. Apparatus according to claim 1 wherein said outer container wall is welded to said lid, said outer container wall including a weakening notch adjacent said lid which breaks under the influence of setback forces to permit said container wall to separate from said lid.

5. Apparatus according to claim 4 wherein said outer container wall is provided with an annular flange welded to said lid.

6. Apparatus according to claim 1 wherein said diaphragm is formed integral with said inner and outer container walls.

7. Apparatus according to claim 6 wherein said diaphragm is of substantially S-shaped cross section.

8. Apparatus according to claim 6 wherein said container walls and diaphragm are made of copper.

9. Apparatus according to claim 6, said chamber having a central detonator hole, said container being received in said chamber with said inner wall of said container engaging the bottom of said casing, said diaphragm extending upwardly away from said casing bottom and radially outwardly to said outer wall of said electrolyte container.

10. Apparatus according to claim 9 including an annular battery stack in said chamber, said battery stack surrounding said electrolyte container for receiving electrolyte from said container under the influence of centrifugal forces.

References Cited

UNITED STATES PATENTS

| | | | |
|---|---|---|---|
| 1,218,847 | 3/1917 | Firey | 136—90X |
| 3,239,384 | 3/1966 | Meyers | 136—90 |
| 3,480,480 | 11/1969 | Merz et al. | 136—90 |

FOREIGN PATENTS

| | | | |
|---|---|---|---|
| 542,860 | 6/1957 | Canada | 136—90 |

CARL D. QUARFORTH, Primary Examiner

H. E. BEHREND, Assistant Examiner